Sept. 5, 1967   J. M. TIFFANY   3,340,510
PULSE CODE RESPONSIVE SIGNAL DETECTOR AND GATE CIRCUIT
Filed July 18, 1963
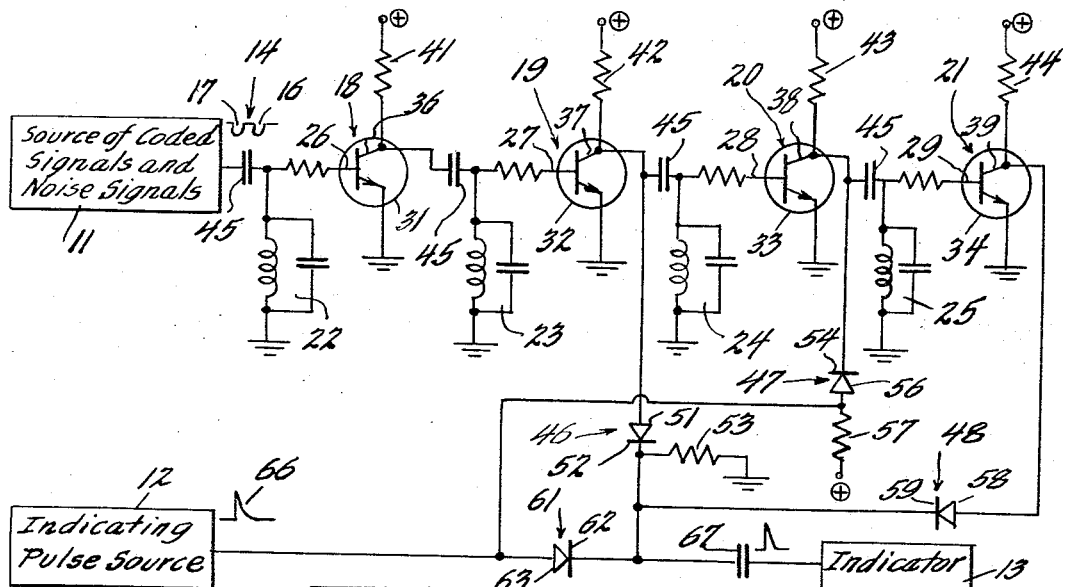
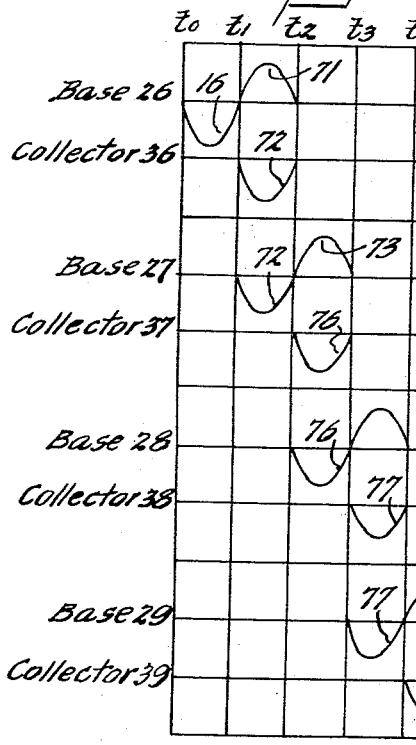
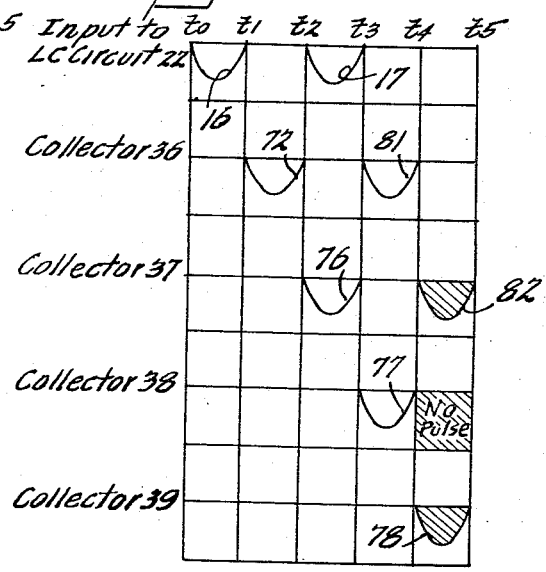
INVENTOR
J.M.Tiffany
BY
W.M.Kain
ATTORNEY

United States Patent Office 3,340,510
Patented Sept. 5, 1967

3,340,510
PULSE CODE RESPONSIVE SIGNAL DETECTOR AND GATE CIRCUIT
John M. Tiffany, Winston-Salem, N.C., assignor to Western Electric Company, Incorporated, New York, N.Y., a corporation of New York
Filed July 18, 1963, Ser. No. 295,953
5 Claims. (Cl. 340—167)

This invention relates to a signal detector and gate circuit and more particularly to a signal detector and gate circuit for discriminating coded signals from noise signals.

A prevalent problem in the operation of radar systems is distinguishing echo pulses reflected by a target from accompanying noise signals. Troublesome noise signals may be in the form of random pulses existing in the atmosphere or undesired pulses generated in the radar equipment itself.

An object of this invention is to provide a new and improved signal detector and gate circuit.

Another object is to provide a signal detector and gate circuit for positively discriminating coded signals from accompanying noise signals.

Another object is to provide a signal detector and gate circuit for positively distinguishing coded echo pulses from accompanying noise pulses and for using the coded echo pulses to operate a gating network.

A further object is to provide a signal detector and gate circuit for selecting coded echo pulses from accompanying noise pulses and for using the coded echo pulses to operate a gating network to allow passage of an indicating pulse to an indicating device.

With these and other objects in view, a signal detector and gate circuit illustrating certain features of the invention may be coupled to a signal source which develops coded signals and noise signals. The circuit includes a plurality of cascaded semiconductor devices coupled to a gating network, for example, a diode gating network. The semiconductor devices are intercoupled by LC networks which select coded signals and pass noise signals to ground. Voltages, which correspond to the selected coded signals, are developed at the outputs of the semiconductor devices for biasing the gating network to permit passage of an indicating pulse to an indicator.

Other objects and advantages of the invention will become apparent from a consideration of the detailed specification and the accompanying drawings, wherein:

FIG. 1 is a schematic diagram of a signal detector and gate circuit including a plurality of cascaded transistor stages having their outputs coupled to a gating network, embodying the principles of the invention;

FIG. 2 is a waveform diagram showing voltages developed by a single pulse of a coded signal at various points of the transistor stages; and FIG. 3 is a waveform diagram showing the voltage conditions which must exist at the outputs of the transistor stages to enable the gating network to pass an indicating pulse to an indicator.

Referring to FIG. 1, there is shown a signal detector and gate circuit interposed between a source of coded signals and noise signals 11, hereafter called the signal source, and an indicating pulse source 12 and an indicator 13.

This circuit can be used in conjunction with the radar target echo indicating system disclosed in J. M. Tiffany Patent 3,212,090 which issued Oct. 12, 1965.

Signal source 11 may be, for example, the receiver portion of the radar system of the above-identified copending application. Coded signals and random noise signals are received by the radar equipment and applied to the receiver. The receiver processes these signals and applies pulses corresponding to these signals along with noise pulses generated in the radar equipment to a gate circuit. The term "noise" is hereafter used to include random signals or pulses which may exist in the atmosphere and random signals or pulses which may be generated in systems equipment.

Indicating pulse source 12 and indicator 13 may be the indicating pulse generating portion of the synchronizer and the cathode-ray tube, respectively, of the above-identified copending application.

A coded signal 14 comprises two negative-going pulses 16 and 17 spaced apart the width of the pulses; for example, each pulse may have a duration of 1.0 microsecond spaced apart by 1.0 microsecond. Thus, coded signal 14 comprises a group of pulses representing a three element code 1–0–1. It is to be understood that the three element coded signal 14 and the illustrated pulse duration are used for purposes of explanation and that the invention is not to be limited to this particular coded signal 14.

The signal detector and gate circuit includes four serially connected or cascaded transistor stages 18–21 and four inductance-capacitance resonant networks 22–25, hereafter called LC networks. Each transistor stage includes, respectively: an NPN transistor 31–34 having an emitter connected to ground potential, a base 26–29 connected through a base resistor to an LC network 22–25 (which has its other end connected to ground), and a collector 36–39 connected through an output resistor 41–44 to a source of positive potential.

Each LC network 22–25 consists of an inductor and a capacitor forming a parallel resonant circuit. The values of the inductor and capacitor are selected such that the pulse width of a pulse 16 or 17 is approximately one-half cycle of the resonant frequency of the sine wave current of the LC network. The inductor and capacitor of LC networks 22–25 are also selected such that the networks pass a relatively narrow band width centered about the resonant frequency.

Signal source 11 is coupled through a capacitor 45 to a junction of LC network 22 and the base resistor of transistor 31. Each collector 36–38 is coupled through a capacitor 45 to a junction of an LC network 23–25 and a base resistor of a transistor 32–34, respectively.

Collectors 37–39 are connected to a diode biasing network including biasing diodes 46–48. More particularly, collector 37 is connected to anode 51 of diode 46 having a cathode 52 connected through a resistor 53 to ground. Collector 38 is connected to cathode 54 of diode 47 having an anode 56 connected through a resistor 57 to a source of positive potential. Collector 39 is connected to anode 58 of diode 48 having a cathode 59 connected to cathode 52. A gate diode 61 has a cathode 62 connected to the junction of cathodes 52 and 59, and an anode 63 connected to anode 56.

Indicating pulse source 12 is connected to anode 63 and repetitively generates an indicating pulse 66. Cathode 62 is coupled through a capacitor 67 to indicator 13.

Operation

Referring to FIGS. 1 and 2, the operation of the circuit will first be described assuming that only coded signals are produced by signal source 11 or that the magnitude of the produced coded signals is much greater than the magnitude of any noise signals.

Pulse 16 of coded signal 14 is coupled through capacitor 45 to base 26 of transistor 31 and LC network 22. NPN transistors 31–34 are normally biased in the non-conducting or reverse direction so that negative-going pulse 16 has no effect on transistor 31; therefore, the pulse is absorbed by LC network 22 and places the network in a resonant condition. As previously mentioned, the pulse width of pulse 16 is approximately one-half cycle of the resonant frequency of the sine wave current of the LC network 22. When pulse 16 returns to zero voltage (one-half cycle later), the energy stored in LC network 22 is returned to the circuit and applied to base 26 of transistor 31 as a positive-going half sine wave pulse 71. A half cycle occupies the time interval between two succeeding time divisions in FIG. 2, for example the time interval $t_0$–$t_1$ is a half cycle.

Positive-going pulse 71 renders transistor 31 conductive so that a negative-going pulse 72 is instantaneously developed at collector 36 and coupled through a capacitor 45 to LC network 23. Negative-going pulse 72 is one-half cycle behind the initiating negative-going pulse 16 which was applied to LC network 22. Negative-going pulse 72 is absorbed by LC circuit 23 and applied one-half cycle later as a positive-going pulse 73 to the base of transistor 32. Positive-going pulse 73 renders transistor 32 conductive so that a negative-going pulse 76 is instantaneously developed at collector 37 and coupled through a capacitor 45 to LC network 24. Negative-going pulse 76 is a full cycle behind initiating negative pulse 16.

This action proceeds through transistor stages 20 and 21, each stage developing a negative-going pulse at its collector that is delayed one-half cycle with respect to the negative-going pulse developed at collector of the previous stage. More particularly, a negative-going pulse 77 is developed at collector 38 one-half cycle later than negative-going pulse 76 is developed at collector 37; and a negative-going pulse 78 is developed at collector 39 one-half cycle later than negative-going pulse 77 is developed at collector 38.

Referring to FIGS. 1 and 3, pulse 17 of coded signal 14, is applied to LC network 22 one full cycle after pulse 16 or two transistor stages apart in time reference; that is, pulse 17 is applied to LC network 22 of transistor stage 18 at time $t_2$ which is a full cycle after pulse 16 was applied to LC network 22 at time $t_0$.

The application of pulse 17 to LC network 22 at time $t_2$ results in a negative-going pulse 81 being developed at collector 36 at time $t_3$. The application of negative-going pulse 81 to LC network 23 at time $t_3$ results in a negative-going pulse 82 being developed at collector 37 at time $t_4$. At time $t_4$, negative-going pulses 78 and 82 are developed simultaneously at collectors 39 and 37 of transistors 34 and 32 due to pulses 16 and 17, respectively, of coded signal 14. There is no negative pulse developed at collector 38 of transistor 33 at time $t_4$. There is positive potential existing at collector 38 due to the positive potential source connected thereto.

When a coded signal 14 is coupled from signal source 11 to the signal detector and gate circuit, the voltages developed at time $t_4$ at collectors 37, 38, and 39 of transistors 32–34 are negative-positive-negative, respectively, representing the code 1–0–1. These voltage conditions are represented in FIG. 3 by cross-hatched lines.

In the quiescent condition, biasing diodes 46 and 48 are biased in the forward or conducting direction by the positive potential existing at collectors 37 and 39 of non-conducting transistors 32 and 34. Biasing diodes 46 and 48 apply this positive potential to cathode 62 to bias gate diode 61 in the reverse or non-conducting direction and thus prevent pulse 66 from passing to indicator 13. When negative-positive-negative voltages are developed at collectors 37, 38, and 39, respectively, biasing diodes 46 and 48 are reversed biased and apply ground potential through resistor 53 to cathode 62 of gate diode 61; biasing diode 47 is reversed biased and applies positive potential through resistor 57 to anode 63. In this manner, gate diode 61 is forward biased and pulse 66 from indicating pulse source 12 is allowed to pass through gate diode 61 and coupled through capacitor 67 to indicator 13.

In the case where noise signals are present along with coded signals, the signal detector and gate circuit of the invention positively discriminates coded signals from noise signals. LC networks 22–25 pass a relatively narrow bandwidth which is centered about the resonant frequency of the LC networks. Noise signals of frequencies below the resonant frequency of the LC networks are passed to ground through the inductors of the networks, and noise signals of frequencies higher than the resonant frequency are passed to ground through the capacitors. The result is considerable discrimination of the circuit against noise signals and good recovery of the pulses of coded signal 14 in that the undesired noise signals are passed to ground and the pulses of the coded signal are applied to the signal detector and gate circuit.

It is possible that some noise signals may not be passed to ground by the LC networks; however, these noise signals would not be coded in accordance with the predetermined pulse spacing of coded signal 14 and no voltages would be developed at collectors 37, 38, and 39 of transistors 32–34 corresponding to the 1–0–1 code of coded signal 14. In this situation, gate diode 61 remains non-conducting and indicating pulse 66 is blocked from passing through the gate diode. Gate diode 61 is forward biased only when negative-positive-negative voltages are simultaneously developed at collectors 37, 38, and 39, respectively. At all other times, gate diode 61 is reversed biased by the application of positive potential to cathode 62 through either or both biasing diodes 46 and 48. Ground potential, existing at collector 38, is applied through diode 47 to anode 69 to further bias gate diode 61 in the reverse direction.

Transistor stage 18 is included in the circuit for the purpose of reshaping the pulses coupled from LC network 22 into pulses having a shape more nearly like a half-sine wave. Transistor stage 18 is included to further refine the operation of the circuit and it is to be understood that the circuit will operate satisfactorily without this transistor stage.

The signal detector and gate circuit of this invention has been described with reference to a radar echo pulse system; however, the circuit has utility in any system where it is desired to discriminate or distinguish a coded signal from noise signals and/or operate a gate. The circuit may also be used as a delay line in which it is desired to delay the pulses of a group of pulses. This is apparent from the fact that the LC networks delay the pulses of the coded signal a half-cycle of the resonant frequency of the networks.

As will be apparent to those skilled in this art, the transistor stages can be replaced by equivalent vacuum tube stages, and the NPN transistors depicted and described can readily be replaced by PNP transistors with a slight modification of the circuit. It will also be apparent to those skilled in this art that the three-element coded signal (1–0–1) utilized in the description and operation of the invention was arbitrary and for purposes of illustration, and that the code can readily be expanded into a larger code by the addition of appropriate circuit elements and modifications.

It is to be understood that the above-described apparatus is merely illustrative of the principles of the invention, and many other embodiments may be devised without departing from the scope of the invention.

What is claimed is:
1. A system for discriminating predetermined coded signals made up of spaced pulses from noise signals and indicating the receipt of the coded signals, comprising:
 means for generating an indicating pulse,
 means coupled to the generating means for indicating the receipt of the indicating pulse,
 a plurality of biasing diodes,
 a gate diode, coupled between the generating means and the indicating means and connected to and normally biased in the non-conducting direction by the biasing diodes, for precluding the passage of the indicating pulse to the indicating means, a source of coded signals and noise signals, a plurality of resonant networks for diverting the noise signals to ground and for passing the spaced pulses of the coded signals, and a plurality of cascaded transistors, coupled to the signal source and serially intercoupled by the resonant networks, for developing voltages at the outputs of the transistors to bias the biasing diodes to overcome the normal bias on the gate diode and permit the passage of an indicating pulse for each coded signal.

2. A signal detector and gate circuit for discriminating predetermined coded signals made up of spaced pulses from noise signals and for gating an indicating pulse from an indicating pulse source to an indicating pulse indicator upon receipt of each coded signal, comprising:

resonant networks for selecting the coded signals from the noise signals, for passing the noise signals to ground, and for delaying the spaced pulses of the coded signals, a gate diode coupled between the indicating pulse source and the indicating pulse generator and normally biased for precluding passage of the indicating pulse to the indicator, a plurality of transistors serially intercoupled by the resonant networks for simultaneously developing output voltages corresponding to pulses of each coded signal selected and delayed by the resonant networks, and a plurality of biasing diodes, each coupled to the gate diode and to one of the plurality of transistors and biased by the output voltages developed by the transistors, for overcoming the normal bias on the gate diode to permit passage of an indicating pulse for each coded signal.

3. A signal detector and gate circuit for discriminating predetermined coded signals made up of spaced pulses from noise signals and for gating an indicating pulse from an indicating pulse source to an indicating pulse indicator, comprising:

resonant networks, each including an inductor and a capacitor, for passing the noise signals to ground and for delaying each pulse of each coded signal a predetermined time, a plurality of transistors serially intercoupled by the resonant networks and responsive to the delayed pulses of each coded signal for developing parallel output voltages coresponding to the delayed pulses of each coded signal, a gate diode connected between the indicating pulse source and the indicator and normally biased in the reverse direction for precluding passage of the indicating pulse to the indicator, and a plurality of biasing diodes, connected between the transistors and the gate diode and normally biased for biasing the gate diode in the reverse direction, and responsive to the developed output voltages for biasing the gate diode in the forward direction to allow passage of an indicating pulse for each coded signal.

4. A signal detector and gate circuit for discriminating predetermined coded signals made up of spaced pulses from noise signals and for gating an indicating pulse from an indicating pulse source to an indicator upon receipt of each coded signal, comprising:

a gate diode connected between the indicating pulse source and the indicator, a plurality of biasing diodes coupled to the gate diode and normally biased for biasing the gate diode to preclude the passage of the indicating pulse to the indicator, a plurality of serially connected transistors normally biased in the non-conducting condition, each transistor having an output connected to a biasing diode for normally biasing the biasing diodes, a first resonant network, connected to the input of the serially connected transistors and including an inductor and a capacitor, for selecting the coded signals from the noise signals, diverting the noise signals to ground, delaying each pulse of each coded signal a predetermined time, and applying each delayed pulse to a first transistor of the plurality of transistors, and a resonant network connected between the output of a previous transistor and the input of a next succeeding transistor of the plurality of transistors for delaying pulses of each coded signal a predetermined time and applying the delay pulse to the next succeeding transistor, the transistors simultaneously developing voltages at their outputs in accordance with the predetermined coded signal to overcome the normal bias on the biasing diodes and permit passage of the indicating pulse.

5. A signal detector for discriminating a coded signal made up of time-spaced pulses from noise signals comprising:

a plurality of cascaded amplifiers;

a plurality of resonant networks, at least one connected to the input of each amplifier for separating the coded signal from the noise signals and for simultaneously developing at the outputs of the amplifiers a pattern of voltages corresponding to the time-spaced voltages of the coded signal; and a gating network coupled to certain ones of said amplifier outputs responsive to the pattern of voltages for sensing the coded signal.

References Cited

UNITED STATES PATENTS

| | | | |
|---|---|---|---|
| 2,735,084 | 2/1956 | Adkisson | 340—167 |
| 3,069,657 | 12/1962 | Green et al. | 340—171 |
| 3,181,162 | 4/1965 | Cameron | 340—164 X |
| 3,184,716 | 5/1965 | Smith | 340—171 |

NEIL C. READ, *Primary Examiner.*

H. I. PITTS, *Assistant Examiner.*